Patented Mar. 6, 1951

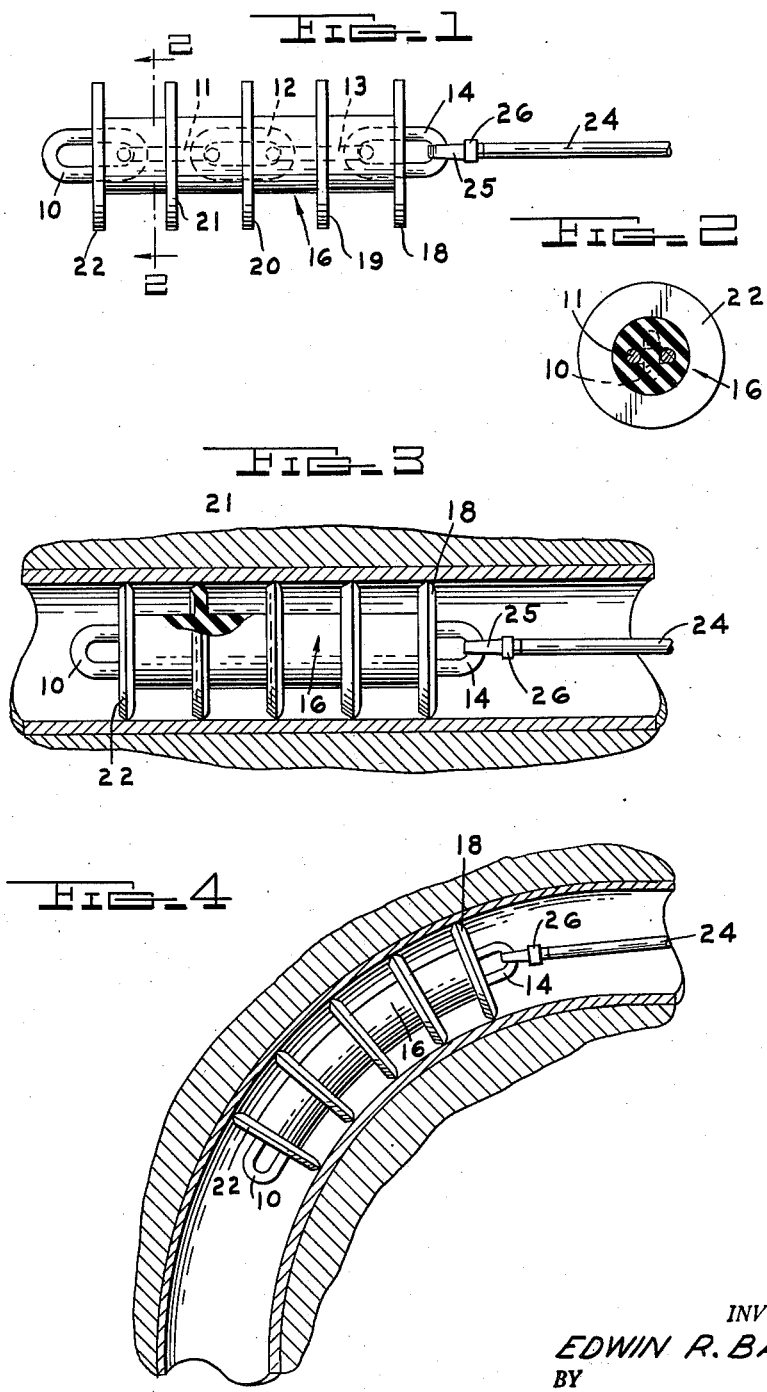

2,544,290

UNITED STATES PATENT OFFICE 2,544,290

RUBBER CONDUIT CLEANER OF THE PLUNGER TYPE

Edwin R. Bailey, Grand Rapids, Mich.

Application February 14, 1948, Serial No. 8,400

2 Claims. (Cl. 15—104.16)

This invention relates to a rubber conduit cleaner of the plunger type.

Electrical contractors specify that pipe be installed in buildings to carry electrical wires to the various parts thereof from the input loop. In many instances this pipe is installed by other workmen at the time that concrete portions of the structure are put in or in cases where locations are to be made inaccessible for pipe installation. When the electrical workman arrives he does not always find the pipes in suitable condition for wire installations. They are apt to contain concrete particles, gravel stones, water, shavings and other foreign matter which must be removed before wires can safely be installed.

The present invention contemplates a device for cleaning these conduits effectively and quickly.

It is an object of the present invention to provide a conduit cleaner which is relatively inexpensive and which is sturdy and durable for continued use.

It is another object of the present invention to provide a conduit cleaner which may be used with threading equipment now commonly employed by electrical installation men.

A further object is the provision of a conduit cleaner which is readily adapted to use in curved and twisted pipes without danger of jamming and with complete adaptability to these curves and irregular shapes to insure effective cleaning of the conduits.

Other objects and features of the invention will be apparent in the following description and claims.

In the drawings:

Figure 1 is an assembly view of the device.

Figure 2 is a sectional view on line 2—2 of Figure 1.

Figure 3 is a view showing the device as it travels through a conduit.

Figure 4 is a view of the device showing a travel through a curved portion of a conduit.

Referring to the drawings, a section of chain is shown in Figure 1 having links 10, 11, 12, 13 and 14. This chain section is preferably made up of solid links and forms a core for the cleaner unit. Around the links is mounted an integral rubber body 16 on which are axially spaced, disc-like flanges 18, 19, 20, 21 and 22. The body 16 is molded in such a way that the apertures between and around the links are entirely filled with the material and the flanges 18—22 are preferably molded integrally with the body.

Various materials may be used, such as oil resistant rubber or other equivalent flexible or pliable material having suitable wear resistance and toughness. It is possible that the device may be made by molding or casting, or by other processes well known. The body 16 is so dimensioned that the ends of links 10 and 14 each project from the body to form hitching loops.

The end of the cleaning device may then be used as a hitch-end and a flexible tape 24 of the type commonly used in construction industry may be fastened to a projecting link as shown in Figure 1 by a loop 25 held by a slide clip 26.

The cleaning flanges are preferably formed of a diameter which is slightly greater than the conduit to be cleaned so that there will be a definite wiping action as the cleaning plunger is pulled through the conduit. As shown in Figure 3, the flanges are slightly displaced axially by reason of this dimensional variation. Preferably the flanges are ⅛ inch larger in diameter than the internal diameter of the pipe. The cleaning plungers will have to be furnished in various sizes to take care of different sized conduits. The relationship of the body 16 to the flanges should be such that the flanges will project radially a sufficient distance to have reasonable flexibility. This will also permit the cleaning plunger to pass corners as shown in Figure 4, where it will be seen that there is full contact between the cleaning plungers and the walls of the conduit.

In operation the workman assigned to the job of cleaning a particular conduit may pass the pull tape through the conduit and then fasten the cleaning plunger to the end loop formed therein; or, he may fasten the cleaning plunger to the tape and then pass the other end of the tape through the conduit. When it projects from the other end, he may grasp the other end and pull the plunger through the conduit. This will remove all foreign matter and water from the conduit and render it ready for installation of electrical wires.

It will thus be seen that I have provided a relatively inexpensive and indestructible cleaner for conduits. The irregularities of the chain core provide ample binding space for the plastic and flexible body and yet the flexibility of the chain provides the necessary distortability to permit the device to pass corners and insures uniform flexing throughout the device so that full contact of all wiping flanges is insured.

What I claim is:

1. A conduit cleaner for structural electric conduits comprising a section of link chain, and a unitary rubber sheathing for said chain section comprising a distortable body section completely embedding the chain with the exception of the end links of which the inner ends only are embedded leaving the the outer ends as fastening loops, and radial projections in the shape of rings formed integrally on the body from end to end to serve as cleaning elements for the inside of a conduit.

2. A conduit cleaner for structural electric conduits comprising a section of link chain, a rubber body completely embedding said chain except the outer ends of the end links which are left free as hitch loops, and radial rubber flanges on said body each lying in a plane transverse of the body and in axially spaced relation from end to end of the body to serve as cleaning elements for the inside of a conduit.

EDWIN R. BAILEY.

REFERENCES CITED

The following references are of record in the file of this patent:

UNITED STATES PATENTS

| Number | Name | Date |
| --- | --- | --- |
| 317,157 | Lowrie | May 5, 1885 |
| 813,739 | Ross | Feb. 27, 1906 |
| 1,218,005 | Schlemmer | Mar. 6, 1917 |
| 1,627,122 | Scott | May 3, 1927 |
| 2,276,109 | Smith | Mar. 10, 1942 |
| 2,452,752 | Hartranft | Nov. 2, 1948 |
| 2,474,690 | Robinson et al. | June 28, 1949 |

FOREIGN PATENTS

| Number | Country | Date |
| --- | --- | --- |
| 16,950 | Great Britain | of 1912 |